US009842388B2

(12) United States Patent
Lamkin et al.

(10) Patent No.: US 9,842,388 B2
(45) Date of Patent: Dec. 12, 2017

(54) SYSTEMS AND METHODS FOR LOCATION AWARE AUGMENTED VISION AIRCRAFT MONITORING AND INSPECTION

(71) Applicant: Honeywell International Inc., Morristown, NJ (US)

(72) Inventors: Andrew Fannon Lamkin, Beaverton, OR (US); Matthew Warpinski, Albuquerque, NM (US); Duke Buster, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 231 days.

(21) Appl. No.: 14/790,328

(22) Filed: Jul. 2, 2015

(65) Prior Publication Data
US 2017/0004610 A1   Jan. 5, 2017

(51) Int. Cl.
*G09G 5/00* (2006.01)
*G06T 7/00* (2017.01)
(Continued)

(52) U.S. Cl.
CPC .......... *G06T 7/0002* (2013.01); *G01C 21/206* (2013.01); *G01C 23/00* (2013.01);
(Continued)

(58) Field of Classification Search
None
See application file for complete search history.

(56) References Cited

U.S. PATENT DOCUMENTS 7,612,716 B2 * 11/2009 Smith .................. G01S 13/765
    342/454
9,207,758 B2 * 12/2015 Cernasov ............... G06F 3/012
(Continued)

FOREIGN PATENT DOCUMENTS

EP       2003535     12/2008
EP       2819100     12/2014
WO    2009010969      1/2009

OTHER PUBLICATIONS

European Patent Office, "European Search Report for EP Patent Application No. 16174880.1 dated Nov. 15, 2016", "from Foreign Counterpart of U.S. Appl. No. 14/790,328", dated Nov. 15, 2016, pp. 1-10, Published in: EP.

*Primary Examiner* — Ryan R Yang
(74) *Attorney, Agent, or Firm* — Fogg & Powers LLC (57) ABSTRACT

Systems and methods for location aware augmented vision aircraft monitoring and inspection are provided. In one embodiment, a method for location aware augmented vision assisted aircraft inspection and monitoring comprises: obtaining status information regarding an aircraft from an on-board aircraft network; obtaining a user location from a user carried augmented vision display device; refining a first data set from the status information based at least in part on the user location; wirelessly transmitting the first data set to the user carried augmented vision display device; determining an orientation of the user carried augmented vision display device with respect to the aircraft; and displaying at least a subset of the first data set on the user carried augmented vision display device, wherein the subset of the first data set is determined at least in part based on the orientation of the user carried augmented vision display device.

18 Claims, 8 Drawing Sheets

(51) Int. Cl.
  *G01C 21/20* (2006.01)
  *G01C 23/00* (2006.01)
  *G06F 3/01* (2006.01)
  *G06T 11/60* (2006.01)
  *G06T 7/70* (2017.01)

(52) U.S. Cl.
  CPC .............. *G06F 3/011* (2013.01); *G06F 3/012* (2013.01); *G06T 7/70* (2017.01); *G06T 11/60* (2013.01)

(56) References Cited

U.S. PATENT DOCUMENTS

| | | | |
|---|---|---|---|
| 2013/0106911 A1* | 5/2013 | Salsman | G01B 11/00 345/633 |
| 2013/0162632 A1 | 6/2013 | Varga et al. | |
| 2014/0063055 A1* | 3/2014 | Osterhout | G06F 3/005 345/633 |
| 2014/0098126 A1* | 4/2014 | Fein | G06T 11/00 345/633 |
| 2014/0188311 A1 | 7/2014 | Masson | |
| 2014/0192084 A1* | 7/2014 | Latta | G06F 21/10 345/633 |
| 2014/0240313 A1 | 8/2014 | Varga | |
| 2014/0347197 A1 | 11/2014 | Boomgarden et al. | |
| 2015/0097863 A1* | 4/2015 | Alaniz | G06T 19/006 345/633 |
| 2015/0356786 A1* | 12/2015 | Bare | G06T 19/006 345/633 |
| 2016/0321880 A1* | 11/2016 | Hamam | A61N 1/40 |

* cited by examiner

SYSTEMS AND METHODS FOR LOCATION AWARE AUGMENTED VISION AIRCRAFT MONITORING AND INSPECTION

BACKGROUND

Augmented vision displays used today in conjunction with aircraft operation are typically integrated into helmets, projected onto fixed glass, or integrated into specialized bulky goggles. These displays usually use a wired connection to the aircraft for operation and are only used in the flight deck to augment flight operations.

For the reasons stated above and for other reasons stated below which will become apparent to those skilled in the art upon reading and understanding the specification, there is a need in the art for alternate systems and methods for providing Augmented Vision Aircraft Monitoring and Inspections.

SUMMARY

The Embodiments of the present invention provide methods and systems for providing Augmented Vision Aircraft Monitoring and Inspections and will be understood by reading and studying the following specification.

In one embodiment, a method for location aware augmented vision assisted aircraft inspection and monitoring comprises: obtaining status information regarding an aircraft from an on-board aircraft network; obtaining a user location from a user carried augmented vision display device; refining a first data set from the status information based at least in part on the user location; wirelessly transmitting the first data set to the user carried augmented vision display device; determining an orientation of the user carried augmented vision display device with respect to the aircraft; and displaying at least a subset of the first data set on the user carried augmented vision display device, wherein the subset of the first data set is determined at least in part based on the orientation of the user carried augmented vision display device.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for location aware augmented vision devices which may be utilized by an aircrew for both inspection and operations monitoring. More specifically, the embodiments described herein enable the display of location relevant information via the user's display as he or she moves throughout the aircraft interior and around the aircraft exterior. Information provided to the augmented vision device is piped through a one way interface which reads information from the flight management systems, navigation systems, on-board sensors, etc. This interface is connected to a display preprocessor that runs an augmented vision display server application which refines the aircraft network data into messages formatted for a tracking transceiver network and the augmented vision device. These messages are sent through the tracking transceiver network and received by the radio hardware incorporated within the augmented vision device, which passes the data to an augmented vision display client application. Information is presented to the user based on location and other relevant aircraft status criteria. Although this disclosure primarily discusses aircraft based implementations, it should be understood that additional embodiments encompass augmented vision display such as described below for other vehicles including vehicles that operate on land or water.

Figure 1:
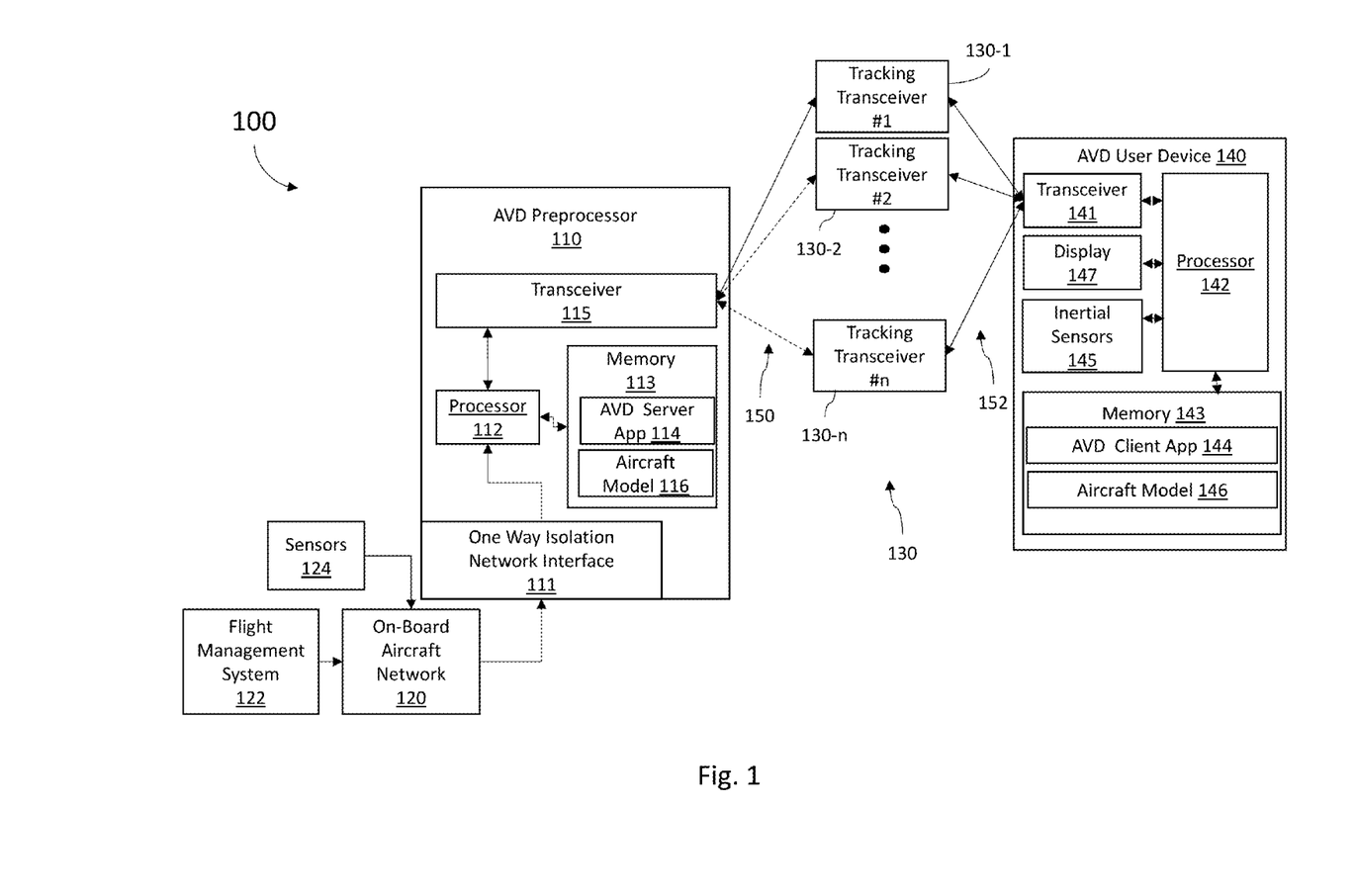
FIG. 1 is a diagram of an augmented vision display system 100 of one embodiment of the present disclosure.

FIG. 1 is a diagram illustrating a location aware augmented vision display (AVD) system 100 of one embodiment of the present disclosure. System 100 comprises an on-board augmented vision display pre-processor 110 in communication with an AVD user device 140 via at least one on-board wireless tracking transceiver (shown generally at 130 and individually at 130-1, 130-2 . . . 130-n). AVD pre-processor 110 comprises a digital processor 112 that is coupled to a memory 113 and executes an augmented vision display server application 114. Executable code and working data for AVD server application 114 may be stored in memory 113. Display pre-processor 110 further comprises a one-way isolation network interface 111 which is connected to the aircraft's on-board aircraft network 120. Via the one-way isolation network interface 111 display pre-processor 110 receives data from the aircrafts flight management system 122 and/or one or more aircraft sensors 124 that provide the data to the on-board aircraft network 120 for consumption by other devices. As its name implies, one-way isolation network interface 111 permits display pre-processor 110 to extract specific items of data communicated over the on-board aircraft network 120, but does not permit display pre-processor 110 to inject or otherwise transmit data, queries or commands onto network 120. Display pre-processor 110 further comprises a radio transceiver 115 which provides two way wireless communications between the augmented vision display servicer application 114 and the AVD user device 140 via the one or more tracking transceivers 130.

As explained in greater detail below, tracking transceivers 130 provide two functions. First, the tracking transceivers 130 act as wireless repeater units transporting data between the display pre-processor 110 and the AVD user device 140. Wireless links between the tracking transceivers 130 and transceiver 115 of AVD Display Preprocessor 110 are shown at 150, while wireless links between the tracking transceivers 130 and AVD user device 140 are shown at 152. In some embodiments, communications between the display pre-processor 110 and the AVD user device 140 at any one time are achieved over a single one of the tracking transceivers 130 (such as tracking transceiver 130-1 for example). In other embodiments, a communication between the display pre-processor 110 and the AVD user device 140 may be spread across multiple tracking transceivers 130 (such as distributed between tracking transceivers 130-1 and 130-2 for example). Second the tracking transceivers 130 act as fixed reference points with respect to the aircraft's frame of reference from which the AVD user device 140 may establish its relative position with respect to the aircraft (such as through the use of signal triangulation, signal strength, or directional antennas, for example). In alternate embodiments, tracking transceivers 130 may be implemented using IEEE 802.11 (WiFi), IEEE 802.15 (ZigBee) or other wireless data communication standards.

AVD user device 140 comprises a processor 142, display 147 and memory 143 that together execute an augmented vision display client application 144. Executable code and working data for AVD client application 144 may be stored in memory 143. In one embodiment, AVD user device 140 is implemented within a user worn headgear device such as glasses, goggles, face shield or helmet. In other embodiments, AVD user device 140 is implemented using a handheld form factor device such as a tablet computer. Augmented vision user device 140 further comprises one or more inertial sensors 145 coupled to processor 142 that provide inertial measurements to augmented vision display client application 144. These inertial measurements are processed by processor 142 to calculate the orientation of AVD user device 140 with respect to the aircraft. For example, where AVD user device 140 is a user worn headgear device, inertial sensors 145 provide inertial measurements that are converted into orientation data indicating which direction the user is facing and the orientation of their head. From this orientation data, the AVD user device 140 determines which portions of the aircraft are within the user's field of view and therefore what information to display on display 147. Augmented vision user device 140 also comprises a transceiver 141 coupled to processor 142 that communicates data between the augmented vision display client application 144 and augmented vision display server application 114 via the at least one of the tracking transceivers 130. In addition, transceiver 141 provides radio signal information to processor 142 from at least one of the tracking transceivers 130, from which the processor 142 can determine its relative position with respect to the aircraft.

In one embodiment, in operation, display pre-processor 110 determines which data set of a plurality of different data sets are provided to augmented vision display client application 144 by the augmented vision display server application 114. This determination of what data set is to be provided to the augmented vision display client application 144 is based on 1) an airborne versus on-ground status of the aircraft, 2) an operational configuration of the aircraft, and 3) the relative position of the AVD user device 140. For example, in one embodiment display pre-processor 110 reads sensor data from aircraft network 120, such as the weight on the landing gear wheels, or whether a cabin door is in an open or closed state, to determine whether the aircraft is on the ground or is airborne. The operational configuration of the aircraft may also be determined from sensor data read from aircraft network 120. For example, in one implementation, which data set is sent to the AVD user device 140 is determined based on engine status (i.e. whether the aircraft's engines are powered up). In other embodiments, other operational configuration states may be utilized. In one embodiment, the relative position of the AVD user device 140 with respect to the aircraft is determined by user device 140 itself (as discussed below) and then that relative AVD position information is communicated back to display pre-processor 110. In one embodiment, memory 113 stores an aircraft model 116 (which is includes physical aircraft equipment layout information of the aircraft) from which the AVD server application 114 identifies aircraft equipment in the proximity of the AVD user device 140 (for example, within a threshold of a predetermined proximity) and selects information for inclusion into a data set sent to AVD user device 140 that is relevant to the identified aircraft equipment. Based on these criteria, a specific data set is collected and sent to the AVD user device 140 that is relevant to both the relative position of the user, and the task that the user intends to perform using AVD user device 140.

At the AVD user device 140, the selected set of data provided by the display pre-processor 110 is received by transceiver 141 and stored in memory 143. Processor 142 inputs inertial measurements from the inertial sensors 145 to determine the orientation of AVD user device 140 and from that the field of view to present on display 147. In one embodiment, augmented vision display client application 144 also includes an aircraft model 146 that describes the physical configuration of the aircraft, and based on the sensed relative position and orientation of the AVD user device 140, filters through the data in memory 143 (which was provided by display pre-processor 110) to display onto display 147 information relevant to equipment within the user's field of view or otherwise relevant given the user's proximity to the equipment.

Figure 2A:
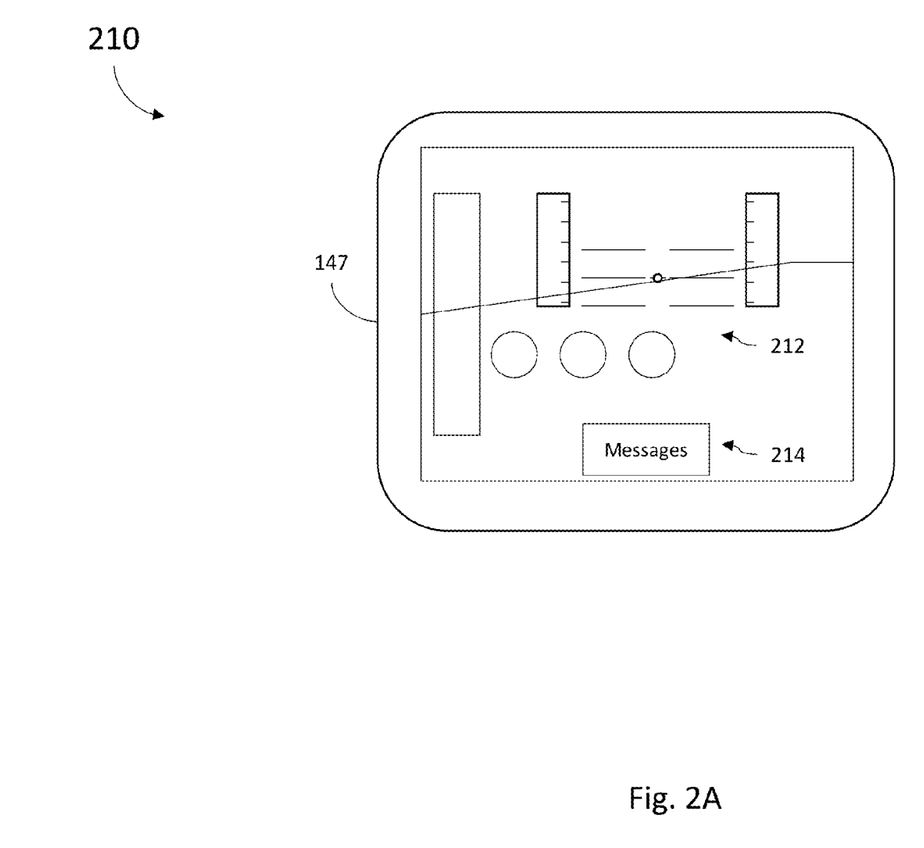
FIGS. 2A, 2B and 2C are diagrams illustrating example displays presented on an augmented vision display user device of one embodiment of the present disclosure.

During flight, data sets selected by display preprocessor 110 for transmission to the AVD user device 140 will emphasize data relevant to aircraft operation and is selected based on the criteria that the aircraft is airborne with engines powered up. For example, as shown in FIG. 2A generally at 210, information presented to a user by AVD user device 140 on display 147 while on the flight deck when the aircraft is airborne may include data that has emphasis on flight aids such as flight instrument indications or messages, navigations aids, speed descent indicators, and glide path visualization (shown generally at 212). When anomalous flight conditions are detected, augmented vision display client application 144 can present one or more messages (shown at 214) on display 147 that may include emergency checklists provided in response to problems with the aircraft and highlighted progress. In some embodiments, emergency checklists may be recalled from memory 143 and displayed in a message region 214 in response to problems with the aircraft and highlight progress toward address the problems. If an equipment failure or other emergency occurs on-board the aircraft, instead of having to interpret a barrage of flight deck annunciators, the augmented vision device may give guidance to the pilot as to what actions are recommended.

Figure 2B:
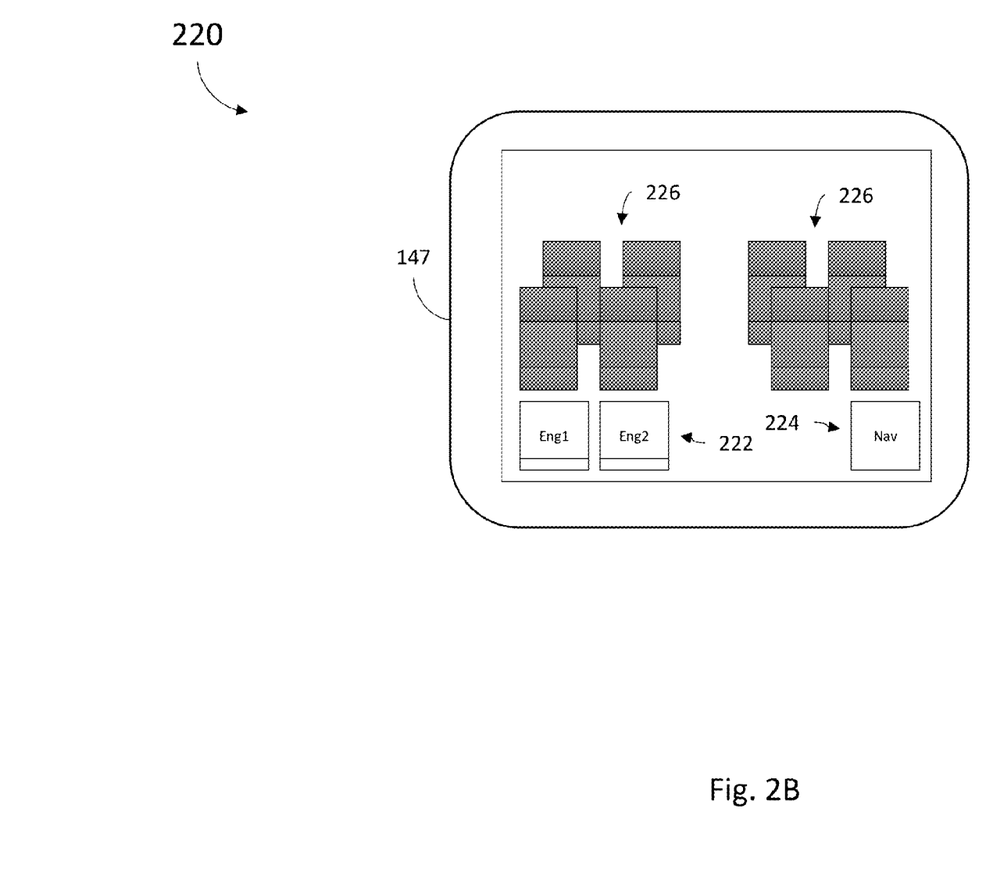

During flight, the pilot may also leave the flight deck with AVD user device 140 and continue to have readouts available as to how the aircraft is operating. As shown in FIG. 2B generally at 220, information included in a data set presented to by AVD user device 140 on display 147 to an in-flight user that has left the flight deck and entered the aircraft cabin may instead have an emphasis on status monitoring. In the example of FIG. 2B, engine management displays are provided at 222, route progress overviews at 224, and digital communications at 226.

Figure 2C:
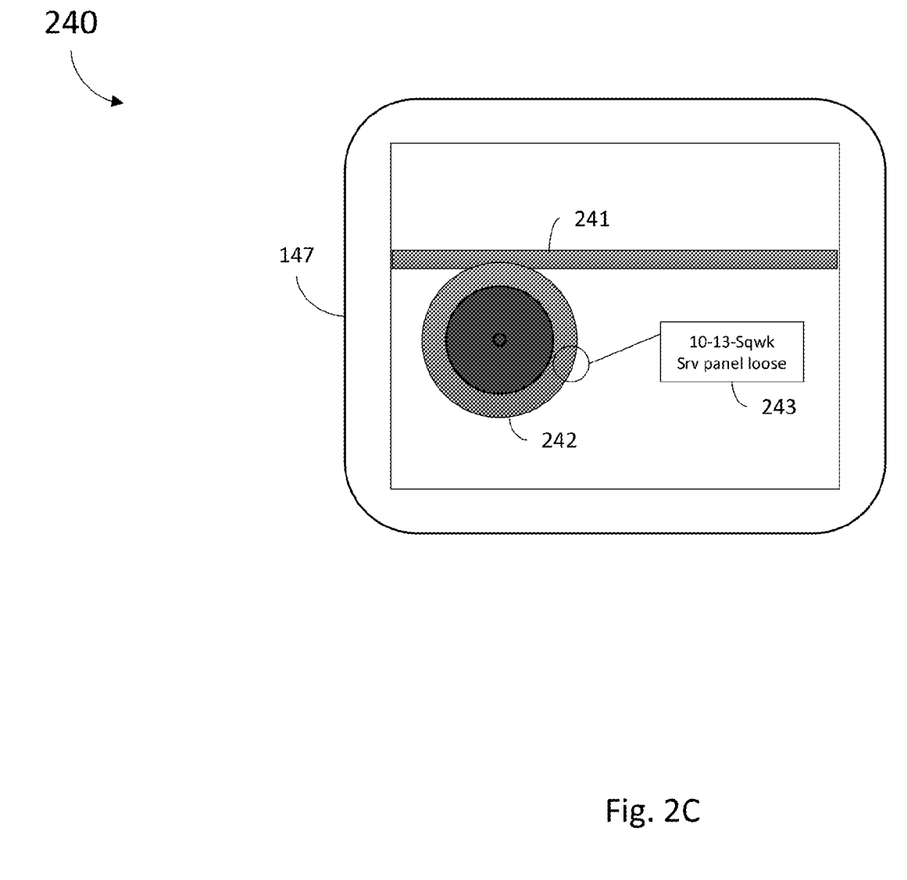

When the aircraft is on the ground, augmented vision display server application 114 may select and transmit to AVD user device 140 a data set that is relevant to a maintenance inspection or pre-flight inspection. For example, in one embodiment, system 100 provides maintenance data to a maintenance technician inspecting the aircraft. The data set transmitted to the AVD user device 140 for the maintenance technician is maintenance relevant data that may be selected based on the criteria, for example, that the aircraft is 1) on the ground and 2) the engines are powered down. Augmented vision user device 140 transmits back to display pre-processor 110 the position of the user, which then sends back to AVD user device 140 data specifically relevant to the user's location. For example, the maintenance technician can walk around the exterior of the aircraft to identify such items needing attention or replacement as indicated by condition based maintenance criteria or other time based maintenance schedule. Items needing such attention would be highlighted in display 147. For example, in one embodiment, current equipment maintenance status information (such as whether maintenance is current, coming due, or past due) for equipment displayed by the AVD user device 140 is obtained by the display pre-processor 110 from the aircraft network 120. In the example of FIG. 2C shown generally at 240, display 147 of AVD user device 140, the maintenance technician orients the AVD user device 140 towards an engine 242 on the wing 241 of the aircraft. In the case where the AVD user device 140 is user worn headgear, the maintenance technician simply needs to look at engine 242. Based on the relative position of AVD user device 140 with respect to the aircraft, AVD server application 114 collects and sends to AVD user device 140 a data set of maintenance and/or condition data relevant to engine 242 because the AVD user device 140 is within a threshold proximity to engine 242. AVD client application 144 then (based on the sensed orientation of AVD user device 140) filters the data set present on display 147 information relevant to aircraft components within the field of view of the maintenance technician. In this case, display 147 present condition information 243 regarding engine 242 that informs the user that a service panel on engine 242 is loose. Using that condition information 243, the user may make the decision to tighten or re-secure the service panel, or further investigate the cause of the condition.

As another example, in one embodiment, system 100 provides preflight inspection data to a pilot inspecting the aircraft. The data set collected and transmitted by AVD server application 114 to the AVD user device 140 in this case is pre-flight inspection relevant data selected based on the criteria that the aircraft is on the ground and further based on another operational configuration state indicating that the aircraft is preparing for flight (such as the engines being powered up). In other implementations, for example when the pilot performs the pre-flight inspection prior to powering up the engines, another indication that the aircraft is in a pre-flight configuration may be utilized. AVD user device 140 transmits back to display pre-processor 110 the position of the pilot, which then sends back to AVD user device 140 pre-flight inspection data specifically relevant to the pilot's location. For example, when the pilot is in the flight deck during the pre-flight state, the pilot's position is transmitted back to the pre-processor 110 which sends back to the AVD user device 140 a data set relevant to pre-flight inspection items which can be completed from the flight deck. These items may be displayed to the pilot on display 147 as a checklist, or specific equipment within the flight deck highlighted on display 147 based on the orientation of the AVD user device 140 as sensed by the inertial sensors 145.

When the pilot moves outside the aircraft to inspect the exterior of the aircraft, the AVD user device 140 transmits back to display pre-processor 110 the position of the pilot, which then sends back to AVD user device 140 pre-flight inspection data specifically relevant to the pilots present position. The pilot can walk around the exterior of the aircraft and display 147 will identify those items the pilot is to visually inspect as part of the pre-flight inspection. In one embodiment, display 147 highlights the different components of the aircraft that need to be inspected and the pilot can use the information on display 147 to keep track of items that have been inspected. For example, in one embodiment, AVD user device 140 maintains a pre-flight inspection checklist in memory and can indicate to the pilot when there are items on the checklist that have yet to be inspected. Referring back to FIG. 2C, the pilot may also observe condition data 243 upon inspection of engine 242 by orienting AVD user device 140 towards engine 242. In this case, condition information 243 will this time inform the pilot that a service panel on engine 242 is loose. Using that condition information 243, the pilot may make the decision to call for maintenance before taking-off to investigate the cause of the condition.

In some embodiments, during maintenance and preflight inspections, some information may remain displayed on display 147 based on users relative position regardless of which direction the AVD user device 140 is oriented. For example, when a user (either a maintenance technician or pilot) approaches within a threshold proximity of the aircraft's engines (such as engine 242), an indication of engine status (i.e., whether it is shut down and safe to approach or in operation) may remain displayed to the user on display 147 regardless of whether the user has that engine in their field of view at that moment.

The on-board wireless tracking transceivers 130 provide a completely localized navigation system tied to the aircraft frame of reference that avoids reliance on global navigation satellite systems (such as Global Positioning System (GPS) receivers for example) signals from which may not always be available (such as within an aircraft hangar) and incorporation of which would require additional complexity to translate user position to the aircraft's frame of reference. The precise location where each of the tracking transceivers 130 are mounted to the aircraft body is known, allowing signals from one or more of the tracking transceivers 130 to be used to either estimate, or more precisely calculate, the relative position of AVD user device 140 with respect to the aircraft using positioning determination means that are known to those of skill in the art and who have studied this disclosure. The greater the number of tracking transceivers 130 mounted to the aircraft, the more precise the positioning determination can be.

For example, where AVD system 100 includes only a single tracking transceiver (130-1, for example), then AVD user device 140 may estimate its proximity to the transceiver based on measuring signal strength. If tracking transceiver 130-1 is mounted within the flight deck, then reception of a strong signal by AVD user device 140 from tracking transceiver 130-1 can be interpreted to mean that AVD user device 140 is positioned within the flight deck. Similarly, reception of a moderately attenuated signal by AVD user device 140 from tracking transceiver 130-1 can be interpreted to mean that AVD user device 140 is positioned within the cabin of the aircraft, but not on the flight deck. Reception of a still more attenuated signal by AVD user device 140 from tracking transceiver 130-1 can be interpreted to mean that AVD user device 140 is positioned outside of the aircraft. With two or more tracking transceivers (130-1 and 130-2, for example), a relative signal strength of signals from each can be utilized to position estimate a two dimension coordinate position of AVD user device 140. Similarly, with three or more tracking transceivers, a still more precise three dimensional coordinate position of AVD user device 140 can be estimated. The greater number of tracking transceivers that available to the AVD user device 140, the more accurate the position determination calculated by AVD user device 140 can be, and the more accurately relevant data can be selected by AVD preprocessor 110 to tailor it to equipment in the proximity of the user.

Figure 3A:
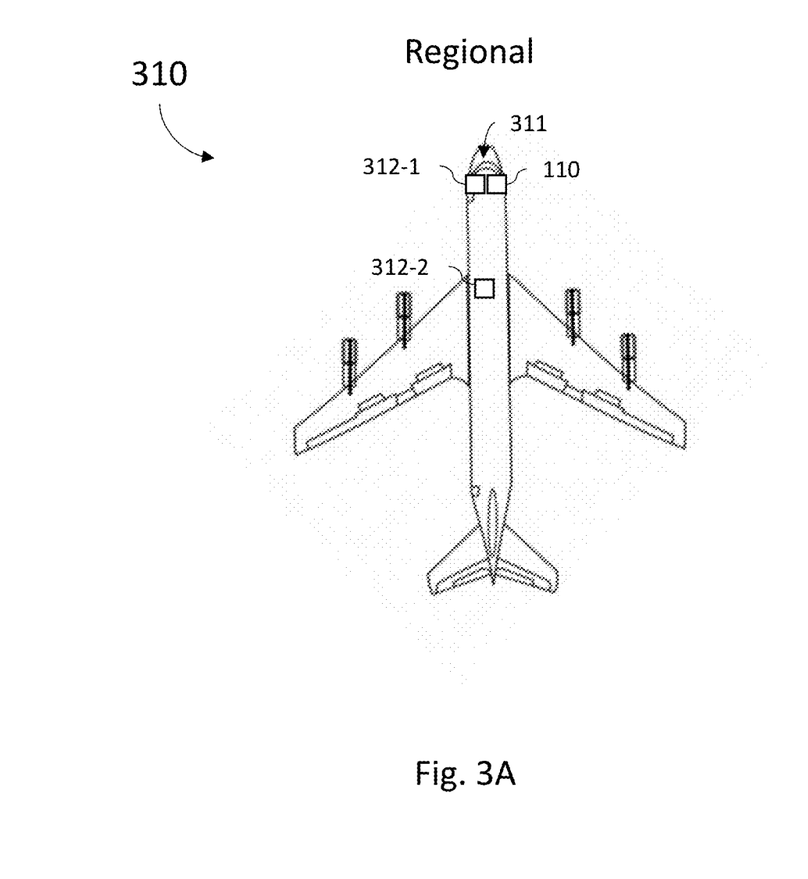
FIGS. 3A and 3B are diagrams illustrating tracking transceiver placement and wireless interconnectivity for a regional aircraft for one embodiment of the present disclosure.
Figure 3B:
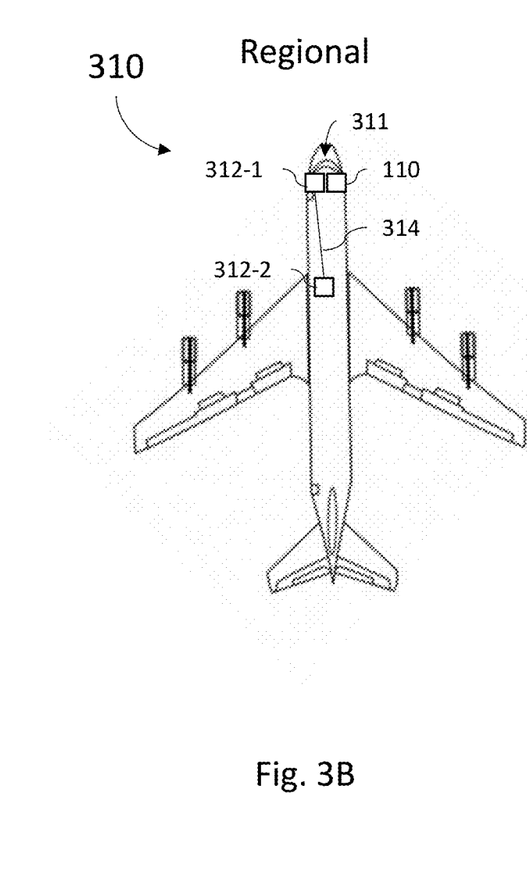

Depending on the size of the aircraft, there may be more or less information to display. Advantageously, larger aircraft which have more components to inspect will also have more places available to which tracking transceivers can be mounted. For example, FIGS. 3A and 3B illustrate an example of tracking transceiver placements for a smaller airline aircraft used for regional routes. In FIG. 3A, an aircraft 310 includes an implementation of AVD system 100 which comprises a single interior tracking transceiver 312-1 mounted within the flight deck 311, and a single exterior tracking transceiver 312-2 mounted to the exterior of aircraft 310. Here, a coarse estimation using transceivers 312-1 and 312-2 may be implemented for determining the position of AVD user device 140, or an even more coarse qualitative position determination can be made simply based on which of the transceivers 312-1 or 312-2 is received with a higher signal by AVD user device 140. As shown in FIG. 3B, in one embodiment, transceivers 312-1 or 312-2 are linked together by a wireless connection 314 so that, for example, transceiver 312-2 may communicate with AVD pre-processor 110 by relaying or routing its communications through transceiver 312-1.

Figure 4A:
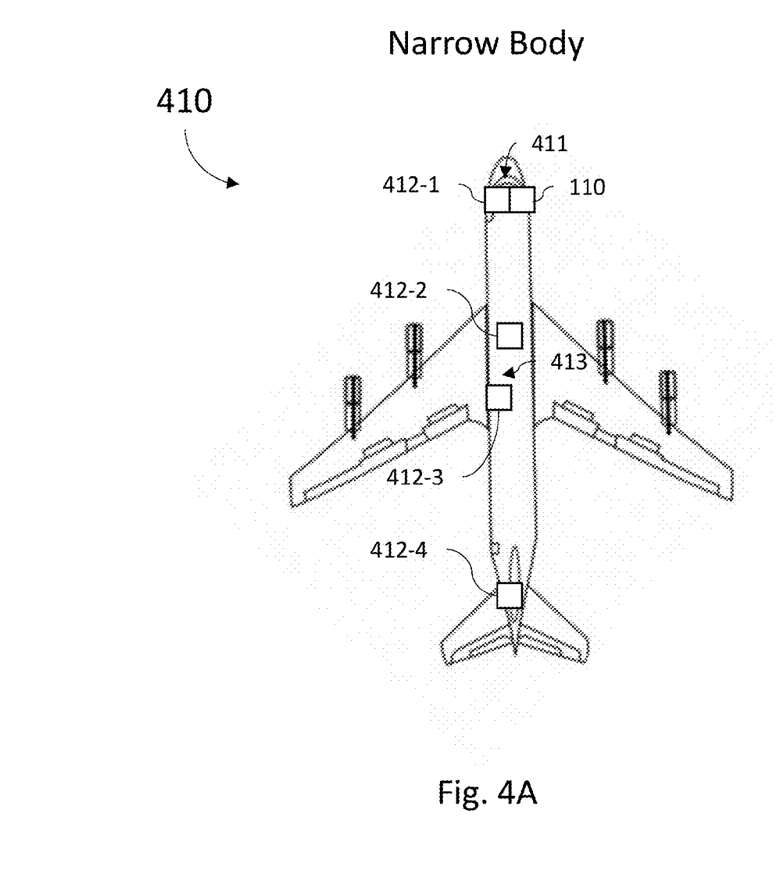
FIGS. 4A and 4B are diagrams illustrating tracking transceiver placement and wireless interconnectivity for a narrow body aircraft for one embodiment of the present disclosure.
Figure 4B:
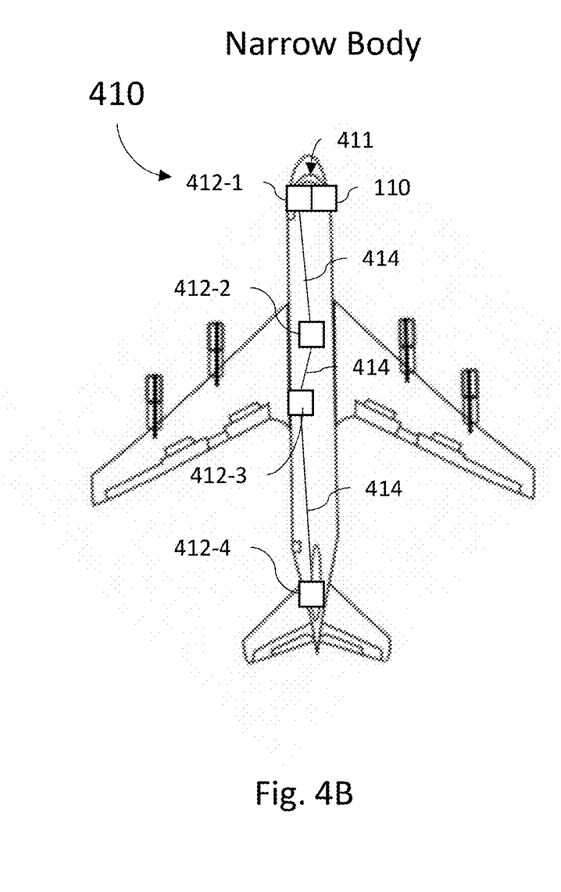

FIGS. 4A and 4B illustrate an example of tracking transceiver placements for a narrow body aircraft 410 that is larger than the regional aircraft 310. In FIG. 4A, aircraft 410 includes an implementation of AVD system 100 which comprises two interior tracking transceivers 412-1 and 412-2. Tracking transceiver 412-1 is mounted within the flight deck 411, while tracking transceiver 412-2 is mounted within the cabin 413 of aircraft 410. This implementation of AVD system 100 also comprises two exterior tracking transceivers 412-3 and 412-4. Tracking transceiver 412-3 is mounted at a mid-body region on the exterior of the aircraft while tracking transceiver 412-4 is mounted to the tail region of aircraft 410. Here, position estimation within the interior of the aircraft 410 can be achieved using two interior tracking transceivers 412-1 and 412-2 while position estimation around the exterior of the aircraft 410 can be achieved using two exterior tracking transceivers 412-3 and 412-4. As shown in FIG. 4B, in one embodiment, two or more of transceivers 412-1, 412-2, 412-3 and 412-4 can be linked together by wireless connections 414 so that, for example, transceivers 412-2, 412-3 and 412-4 may communicate with AVD pre-processor 110 by relaying or routing communications through each other to transceiver 412-1.

Figure 5A:
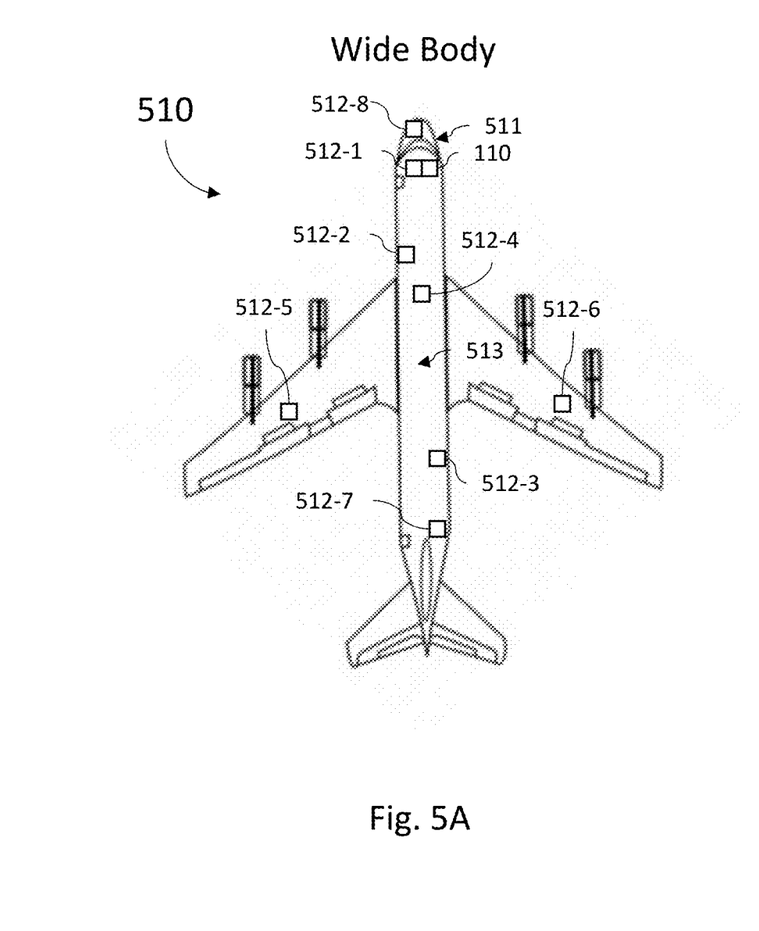
FIGS. 5A and 5B are diagrams illustrating tracking transceiver placement and wireless interconnectivity for a wide body aircraft for one embodiment of the present disclosure.
Figure 5B:
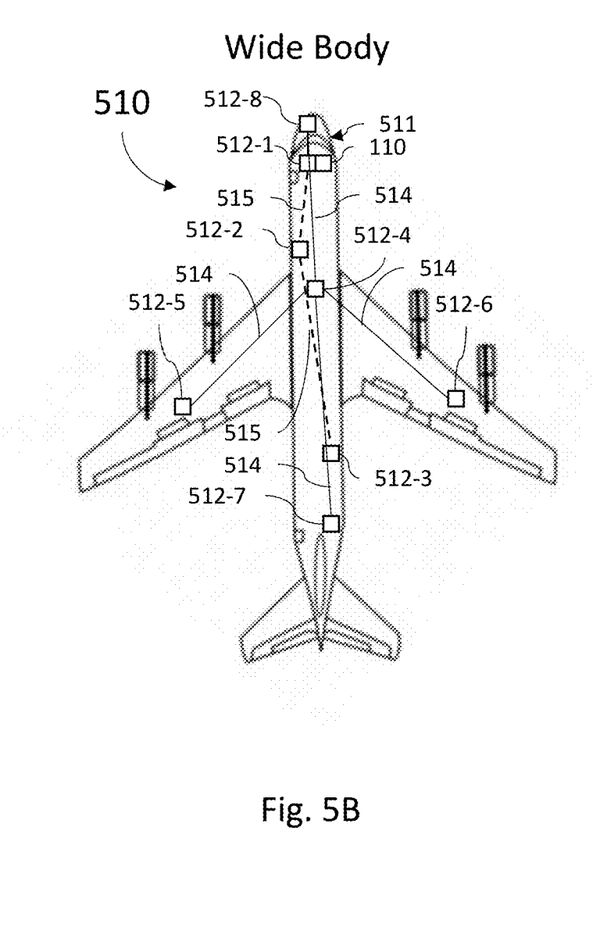

FIGS. 5A and 5B illustrate an example of tracking transceiver placements for a wide body aircraft 510 that is larger than the narrow body aircraft 410. For wide body aircraft 510, using multiple (three or more) internal and external tracking transceivers 130 allows for positioning determination of AVD user device 140 with much more detail. In FIG. 5A, aircraft 510 includes an implementation of AVD system 100 which comprises three interior tracking transceivers 512-1, 512-2 and 512-3, enabling precision triangulation within aircraft 510. Tracking transceiver 512-1 is mounted within the flight deck 511, tracking transceiver 512-2 is mounted mid-body within the cabin 513 of aircraft 510, and tracking transceiver 512-3 is mounted near the aft within the cabin 513 of aircraft 510. This implementation of AVD system 100 also comprises five exterior tracking transceivers 512-4, 512-5, 512-6, 512-7 and 512-8. tracking transceiver 512-4 is mounted at a mid-body region on the exterior of the aircraft, tracking transceiver 512-5 is mounted onto the left wing of the aircraft, tracking transceiver 512-6 is mounted onto the right wing of the aircraft, tracking transceiver 512-7 is mounted to the tail region of aircraft 510, while tracking transceiver 512-4 is mounted to the nose region of aircraft 510. Instead of just a rough estimate that the user is near the front or near the back of aircraft 512, with this configuration, AVD user device 140 can triangulate to precisely place its position as being near, for example, the aircraft nose, right engine or left engine, right landing gear or left landing gear, etc. As shown in FIG. 5B, in one embodiment, two or more of the interior tracking transceivers 512-1, 512-2 and 512-3 can be linked together by wireless connections 515 so that, for example, transceivers 512-1, 512-2 and 512-3 may communicate with AVD pre-processor 110 by relaying or routing communications through each other to transceiver 512-1. Similarly, two or more of the exterior tracking transceivers 512-4, 512-5, 512-6, 512-7 and 512-8 can be linked together by wireless connections 514 so that, for example, transceivers 512-4, 512-5, 512-6, 512-7 and 512-8 may communicate with AVD pre-processor 110 by relaying or routing communications through each other to transceiver 512-1.

Although signal strength and triangulation techniques have been described above, embodiments of the present disclosure are not limited to just such techniques for determining the relative position of AVD user device 140 with respect to an aircraft. For example, in still other implementations of AVD system 100, directional antennas and/or a phased antenna array may be incorporated into AVD system 100 and coupled to one or more of the tracking transceivers 130 to implement a position determination technique for determining the relative position of AVD user device 140 with respect to an aircraft using means that are known to those of skill in the art and who have studied this disclosure.

Figure 6:
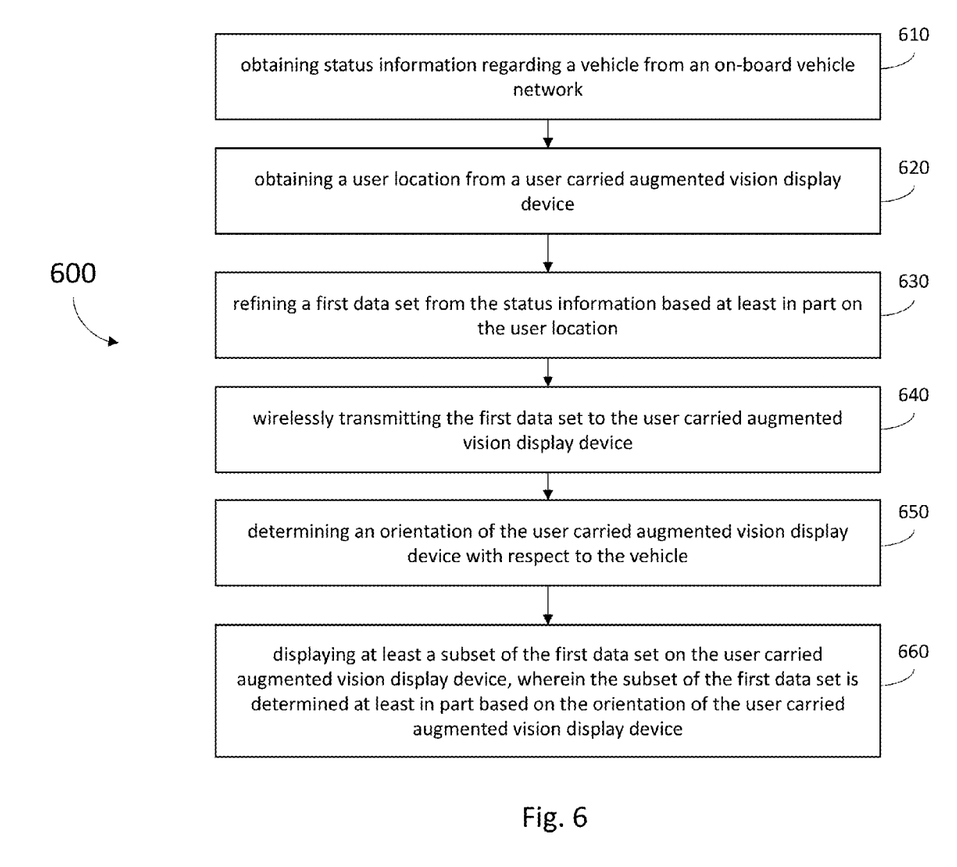
FIG. 6 is a flow chart illustrating a method of one embodiment of the present disclosure.

FIG. 6 is a flow chart illustrating a method 600 of one embodiment of the present disclosure for aircraft monitoring using augmented vision. In at least one implementation, method 600 is implemented using any one of the AVD system 100 embodiments described above. As such, elements of method 600 may be used in conjunction with, in combination with, or substituted for elements of the AVD system 100 embodiments described above. Further, the description of elements for AVD system 100 described above apply to like named elements of method 600 and vice versa. In some embodiments, the method may be performed on a vehicle that is an aircraft, or performed on another type vehicle.

The method begins at 610 with obtaining status information regarding an aircraft from an on-board vehicle network. The status information, which may be generated by one or more sensors and/or the aircraft flight management system may include real time operational information such as whether the aircraft is airborne versus on-ground, the operational configuration of the aircraft, or other on-board sensor generated information. For example, in one embodiment a the method at 610 may include an AVD pre-processor reading sensor data from an aircraft network, such as the weight on the landing gear wheels, or whether a cabin door is in an open or closed state, to determine whether the aircraft is on the ground or is airborne. The operational configuration of the aircraft may also be determined from sensor data read from the aircraft network. For example, in one implementation, which data set is sent to the AVD user device 140 is determined based on engine status (i.e., whether the aircraft's engines are powered up). In other embodiments, other operational configuration states may be utilized. Status information may also include one or both of condition based maintenance information and scheduled maintenance information relevant to aircraft components. Such information can indicate to a maintenance technician items needing attention or replacement as indicated by condition based maintenance criteria or other time based maintenance schedule as explained above.

The method proceeds to 620 with obtaining a relative position of a user carried augmented vision display (AVD) user device with respect to the vehicle. In one embodiment, the AVD user device is implemented within a user worn headgear device such as glasses, goggles, face shield or helmet. In other embodiments, the AVD user device is implemented using a handheld form factor device such as a tablet computer. The AVD user device may establish its relative position with respect to the aircraft based on wireless signals received from one or more tracking transceivers (which act as fixed reference points with respect to an aircraft based frame of reference). In one embodiment obtaining the relative position of the AVD user device performed using tracking transceivers implemented using IEEE 802.11 (Wi-Fi), IEEE 802.15 (ZigBee) or other wireless data communication standards and by means known to those of skill in the art who have reviewed this disclosure. Such means may include, but are not limited to use of signal triangulation, signal strength, directional antennas and/or phased antenna arrays, for example.

The method proceeds to 630 with refining a first data set from the status information based at least in part on the user location. In one embodiment, the refining at 630 includes identifying aircraft equipment in the proximity of the AVD user device and selecting status information obtained at 610 for inclusion into the first data set sent to AVD user device that is relevant to the identified aircraft equipment. In other words, the first data set is a specific data set that is collected and sent to the AVD user device of information relevant to both the relative position of the user, and the task that the user intends to perform using the AVD user device. Accordingly, the method proceeds to 640 with wirelessly transmitting the first data set to the user carried augmented vision display device. In one embodiment, wirelessly transmitting comprises routing or relaying the first data set through one or more of the tracking transceivers.

The method proceeds to 650 with determining an orientation of the user carried augmented vision display device with respect to the vehicle. In one implementation the AVD user device comprises one or more inertial sensors coupled to a processor that provide inertial measurements to the AVD client application. These inertial measurements are processed by the processor to calculate the orientation of AVD user device with respect to the aircraft. For example, where the AVD user device the is a user worn headgear device, the inertial sensors provide inertial measurements that are converted into orientation data indicating which direction the user is facing and the orientation of their head. From this orientation data, the AVD user device determines which portions of the aircraft are within the user's field of view and therefore what information to display. Accordingly, the method proceeds to 660 with displaying at least a subset of the first set of data on the user carried augmented vision display device, wherein the subset of the first set of data is determined at least in part based on the orientation of the user carried augmented vision display device. In one embodiment, the augmented vision display client application includes an aircraft model that describes the physical configuration of the aircraft, and based on the sensed relative position and orientation of the AVD user device filters through the first data set (which was wirelessly provided at 640) to display information on the AVD user device that is relevant to equipment within the user's field of view or otherwise relevant given the user's proximity to the equipment.

Example Embodiments

Example 1 includes a method for location aware augmented vision assisted inspection and monitoring, the method comprising: obtaining status information regarding a vehicle from an on-board vehicle network; obtaining a user location from a user carried augmented vision display device; refining a first data set from the status information based at least in part on the user location; wirelessly transmitting the first data set to the user carried augmented vision display device; determining an orientation of the user carried augmented vision display device with respect to the vehicle; and displaying at least a subset of the first data set on the user carried augmented vision display device, wherein the subset of the first data set is determined at least in part based on the orientation of the user carried augmented vision display device.

Example 2 includes the method of example 1, wherein the status information comprises at least one of: condition based maintenance information; scheduled maintenance information; real time operational information.

Example 3 includes the method of example 2, wherein the vehicle is an aircraft and the real time operational information obtained from the on-board vehicle network comprises at least one of: information indicating whether the aircraft is airborne or landed; and an operational configuration of the aircraft.

Example 4 includes the method of any of examples 2-3, wherein refining the first set of data from the status information further includes selecting the first set of data further based on the real time operational information.

Example 5 includes the method of any of examples 1-4, wherein refining the first set of data from the status information based at least in part on the user location further comprises: filtering the status information to include data regarding vehicle equipment within a threshold proximity of the user location.

Example 6 includes the method of any of examples 1-5, further comprising displaying on the user carried augmented vision display device at least part of a pre-flight checklist based on the subset of the first set of data.

Example 7 includes the method of any of examples 1-6, wherein obtaining the user location from the user carried augmented vision display device further comprises: receiving a radio signal at the user carried augmented vision display device from at least one tracking transceiver mounted to the vehicle; and determining a relative position of the user carried augmented vision display device with respect to the vehicle based on the radio signal.

Example 8 includes the method of example 7, wherein the at least one tracking transceiver comprises a wireless radio signal repeater in wireless communication with the user carried augmented vision display device and further in wireless communication with an augmented vision display preprocessor device installed on the vehicle, wherein the augmented vision display preprocessor device is coupled to the on-board vehicle network.

Example 9 includes the method of example 8, wherein wirelessly transmitting the first set of data to the user carried augmented vision display device further comprises relaying the first set of data from the augmented vision display preprocessor to the user carried augmented vision display device via the at least one tracking transceiver.

Example 10 includes the method of any of examples 7-9, wherein determining the relative position of the user carried augmented vision display device with respect to the vehicle based on the radio signal further comprises at least one of: triangulation using at least three radio signals from at least three tracking transceivers; determining a distance from at least one tracking transceiver based on a signal strength; or evaluating radio signals transmitted using either a directional antenna or a phased antenna array.

Example 11 includes the method of any of examples 1-10, wherein determining an orientation of the user carried augmented vision display device with respect to the vehicle further comprises: processing inertial measurements generated by one or more inertial sensors attached to the user carried augmented vision display device.

Example 12 includes a location aware augmented vision aircraft inspection and monitoring system, the system comprising: an on-board augmented vision display pre-processor installed within a vehicle, wherein the on-board augmented vision display pre-processor includes a digital processors coupled to a memory, and wherein the digital processor executes an augmented vision display server application; a user carried mobile augmented vision user device; and at least one on-board wireless tracking transceiver attached to the vehicle; wherein the an on-board augmented vision display pre-processor comprises a one-way isolation network interface communicatively connected to an on-board vehicle network, wherein via the a one-way isolation network interface the on-board augmented vision display pre-processor receives status information regarding the vehicle; wherein the augmented vision display server application obtains a user location from the user carried mobile augmented vision user device, and refines a first set of data from the status information based at least in part on the user location and wirelessly transmits the first set of data to the user carried augmented vision display device via the at least one on-board wireless tracking transceiver.

Example 13 includes the system of example 12, wherein the user carried mobile augmented vision user device comprises: a display; at least one inertial sensor that outputs inertial measurements; a transceiver configured to communicate with the at least one on-board wireless tracking transceiver; a second digital processors coupled to a second memory, wherein the second digital processor executes an augmented vision display client application; wherein the augmented vision display client application determines an orientation of the user carried augmented vision display device with respect to the aircraft based on the inertial measurements; and wherein the augmented vision display client application presents at least a subset of the first set of data on the display, wherein the subset of the first set of data is determined at least in part based on the orientation of the user carried augmented vision display device.

Example 14 includes the system of example 13, wherein the augmented vision display client application determines the user location by calculating a relative position of the user carried augmented vision display device with respect to the vehicle based on at least one of: triangulation using at least three radio signals from at least three tracking transceivers; determining a distance from at least one tracking transceiver based on a signal strength; or evaluating radio signals transmitted by the at least one on-board wireless tracking transceiver via either a directional antenna or a phased antenna array.

Example 15 includes the system of any of examples 12-14, wherein the status information comprises at least one of: condition based maintenance information; scheduled maintenance information; real time operational information.

Example 16 includes the system of example 15, wherein the vehicle is an aircraft and the real time operational information obtained from the on-board vehicle network comprises at least one of: information indicating whether the aircraft is airborne or landed; and an operational configuration of the aircraft.

Example 17 includes the system of any of examples 15-16, wherein the augmented vision display server application refines the first set of data from the status information based at least in part on the on the real time operational information.

Example 18 includes the system of any of examples 12-17, wherein the augmented vision display server application refines the first set of data from the status information by filtering the status information to include data regarding vehicle equipment within a threshold proximity of the user location.

Example 19 includes the system of any of examples 12-18, wherein the at least one on-board tracking transceiver comprises a wireless radio signal repeater in wireless communication with the user carried augmented vision display device and further in wireless communication with the on-board augmented vision display preprocessor.

Example 20 includes the system of any of examples 12-19, wherein the at least one on-board wireless tracking transceiver comprises: at least one internal tracking transceiver located within a flight deck of an aircraft; at least one internal tracking transceiver located within a cabin of the aircraft; or at least one external tracking transceiver.

In various alternative embodiments, system elements, method steps, or examples described throughout this disclosure (such as the AVD Preprocessor or the AVD User Device, or sub-parts thereof, for example) may be implemented on one or more computer systems, field programmable gate arrays (FPGAs), or similar devices comprising a processor executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for location aware augmented vision assisted inspection and monitoring, the method comprising:
    obtaining status information regarding a vehicle from an on-board vehicle network;
    obtaining a user location from a user carried augmented vision display device;
    refining a first data set from the status information based at least in part on the user location;
    wirelessly transmitting the first data set to the user carried augmented vision display device;
    determining an orientation of the user carried augmented vision display device with respect to the vehicle; and
    displaying at least a subset of the first data set on the user carried augmented vision display device, wherein the subset of the first data set is determined at least in part based on the orientation of the user carried augmented vision display device;
    wherein obtaining the user location from the user carried augmented vision display device further comprises:
    receiving a radio signal at the user carried augmented vision display device from at least one tracking transceiver mounted to the vehicle; and
    determining a relative position of the user carried augmented vision display device with respect to the vehicle based on the radio signal;
    wherein the at least one tracking transceiver comprises a wireless radio signal repeater in wireless communication with the user carried augmented vision display device and further in wireless communication with an augmented vision display preprocessor device installed on the vehicle, wherein the augmented vision display preprocessor device is coupled to the on-board vehicle network.

2. The method of claim 1, wherein the status information comprises at least one of:
    condition based maintenance information;
    scheduled maintenance information;
    real time operational information.

3. The method of claim 2, wherein the vehicle is an aircraft and the real time operational information obtained from the on-board vehicle network comprises at least one of:
    information indicating whether the aircraft is airborne or landed; and
    an operational configuration of the aircraft.

4. The method of claim 2, wherein refining the first set of data from the status information further includes selecting the first set of data further based on the real time operational information.

5. The method of claim 1, wherein refining the first set of data from the status information based at least in part on the user location further comprises:
    filtering the status information to include data regarding vehicle equipment within a threshold proximity of the user location.

6. The method of claim 1, further comprising displaying on the user carried augmented vision display device at least part of a pre-flight checklist based on the subset of the first set of data.

7. The method of claim 1, wherein wirelessly transmitting the first set of data to the user carried augmented vision display device further comprises relaying the first set of data from the augmented vision display preprocessor to the user carried augmented vision display device via the at least one tracking transceiver.

8. The method of claim 1, wherein determining the relative position of the user carried augmented vision display device with respect to the vehicle based on the radio signal further comprises at least one of:
    triangulation using at least three radio signals from at least three tracking transceivers;
    determining a distance from at least one tracking transceiver based on a signal strength; or
    evaluating radio signals transmitted using either a directional antenna or a phased antenna array.

9. The method of claim 1, wherein determining an orientation of the user carried augmented vision display device with respect to the vehicle further comprises:
    processing inertial measurements generated by one or more inertial sensors attached to the user carried augmented vision display device.

10. A location aware augmented vision aircraft inspection and monitoring system, the system comprising:
    an on-board augmented vision display pre-processor installed within a vehicle, wherein the on-board augmented vision display pre-processor includes a digital processors coupled to a memory, and wherein the digital processor executes an augmented vision display server application;
    a user carried mobile augmented vision user device; and
    at least one on-board wireless tracking transceiver attached to the vehicle;
    wherein the an on-board augmented vision display pre-processor comprises a one-way isolation network interface communicatively connected to an on-board vehicle network, wherein via the a one-way isolation network interface the on-board augmented vision display pre-processor receives status information regarding the vehicle;
    wherein the augmented vision display server application obtains a user location from the user carried mobile augmented vision user device, and refines a first set of data from the status information based at least in part on the user location and wirelessly transmits the first set of data to the user carried augmented vision display device via the at least one on-board wireless tracking transceiver.

11. The system of claim 10, wherein the user carried mobile augmented vision user device comprises:
    a display;
    at least one inertial sensor that outputs inertial measurements;

a transceiver configured to communicate with the at least one on-board wireless tracking transceiver;
a second digital processors coupled to a second memory, wherein the second digital processor executes an augmented vision display client application;
wherein the augmented vision display client application determines an orientation of the user carried augmented vision display device with respect to the aircraft based on the inertial measurements; and
wherein the augmented vision display client application presents at least a subset of the first set of data on the display, wherein the subset of the first set of data is determined at least in part based on the orientation of the user carried augmented vision display device.

12. The system of claim 11, wherein the augmented vision display client application determines the user location by calculating a relative position of the user carried augmented vision display device with respect to the vehicle based on at least one of:
triangulation using at least three radio signals from at least three tracking transceivers;
determining a distance from at least one tracking transceiver based on a signal strength; or
evaluating radio signals transmitted by the at least one on-board wireless tracking transceiver via either a directional antenna or a phased antenna array.

13. The system of claim 10, wherein the status information comprises at least one of:
condition based maintenance information;
scheduled maintenance information;
real time operational information.

14. The system of claim 13, wherein the vehicle is an aircraft and the real time operational information obtained from the on-board vehicle network comprises at least one of:
information indicating whether the aircraft is airborne or landed; and
an operational configuration of the aircraft.

15. The system of claim 13, wherein the augmented vision display server application refines the first set of data from the status information based at least in part on the on the real time operational information.

16. The system of claim 10, wherein the augmented vision display server application refines the first set of data from the status information by filtering the status information to include data regarding vehicle equipment within a threshold proximity of the user location.

17. The system of claim 10, wherein the at least one on-board tracking transceiver comprises a wireless radio signal repeater in wireless communication with the user carried augmented vision display device and further in wireless communication with the on-board augmented vision display preprocessor.

18. The system of claim 10, wherein the at least one on-board wireless tracking transceiver comprises:
at least one internal tracking transceiver located within a flight deck of an aircraft;
at least one internal tracking transceiver located within a cabin of the aircraft; or
at least one external tracking transceiver.

* * * * *